J. GORDON.
ROTARY HARROW.
APPLICATION FILED OCT. 4, 1918.

1,331,340.

Patented Feb. 17, 1920.
4 SHEETS—SHEET 3.

Witnesses
Philip Ferrell
Francis L. O'well

Inventor
J. Gordon
By D. Swift & Co.
his Attorney

J. GORDON.
ROTARY HARROW.
APPLICATION FILED OCT. 4, 1918.
1,331,340.
Patented Feb. 17, 1920.
4 SHEETS—SHEET 4.
Fig. 5.
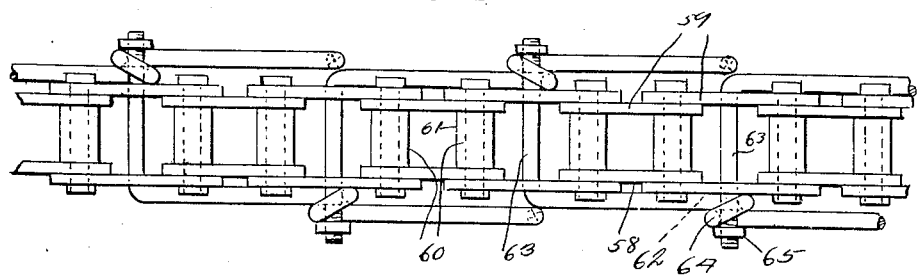
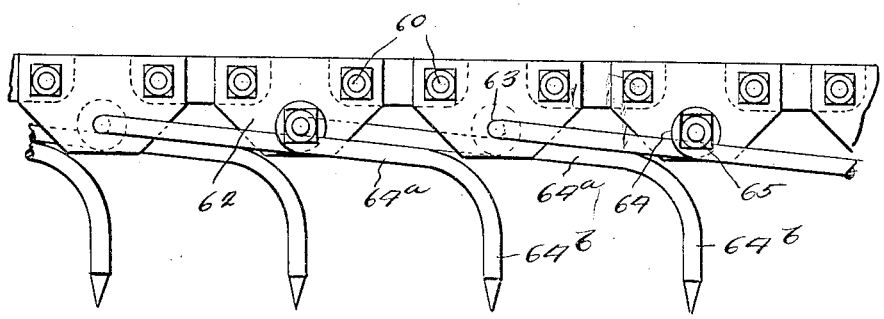
Fig. 6.
Witnesses
Philip Sewell
Francis L. Boswell
Inventor
J. Gordon
By D. Swift & Co.
Attorneys

UNITED STATES PATENT OFFICE.

JAMES GORDON, OF MONMOUTH, ILLINOIS.

ROTARY HARROW.

1,331,340.  Specification of Letters Patent.  Patented Feb. 17, 1920.

Application filed October 4, 1918. Serial No. 256,889.

*To all whom it may concern:*

Be it known that I, JAMES GORDON, a citizen of the United States, residing at Monmouth, in the county of Warren, State of Illinois, have invented a new and useful Rotary Harrow; and I do hereby declare the following to be a full, clear, and exact description of the invention, such as will enable others skilled in the art to which it appertains to make and use the same.

This invention relates to an improved rotary harrow, and an object of the invention is to provide an improved, efficient and practical machine of this design, adapted for attachment to a tractor (not shown) whereby the moving parts may receive power from the tractor.

A further object of the invention is to provide a machine of this kind having circular and rotatable disk harrows, whereby the soil may be harrowed at right angles, that is in opposite directions.

A further object of the invention is to provide a transversely rotatable mulching chain, for mulching the soil transversely, that is, leveling off and breaking up the clods.

A further object of the invention is to provide improved gear connections for the disk harrows and the mulching chain, and connections with the tractor, whereby such parts may receive power from the tractor.

A further object of the invention is the provision of a mechanism for raising and lowering the supporting wheels of the harrow, whereby the disk harrows and mulching chain may be moved into and out of engagement with the soil.

In practical fields the details of construction may necessitate alterations falling within the scope of what is claimed.

The invention comprises further features and combination of parts as hereinafter set forth, shown in the drawings and claimed.

In the drawing:—

Fig. 5 is an enlarged plan view of the mulching chain.

Fig. 6 is an enlarged side elevation of the mulching chain shown in Fig. 5.

Fig. 7 is an enlarged detail view of the connection (which consists of a flexible shaft) between the main driving shaft of the harrow, and a shaft of a tractor (not shown), whereby power may be transmitted to the moving part of the harrow.

Figure 1:
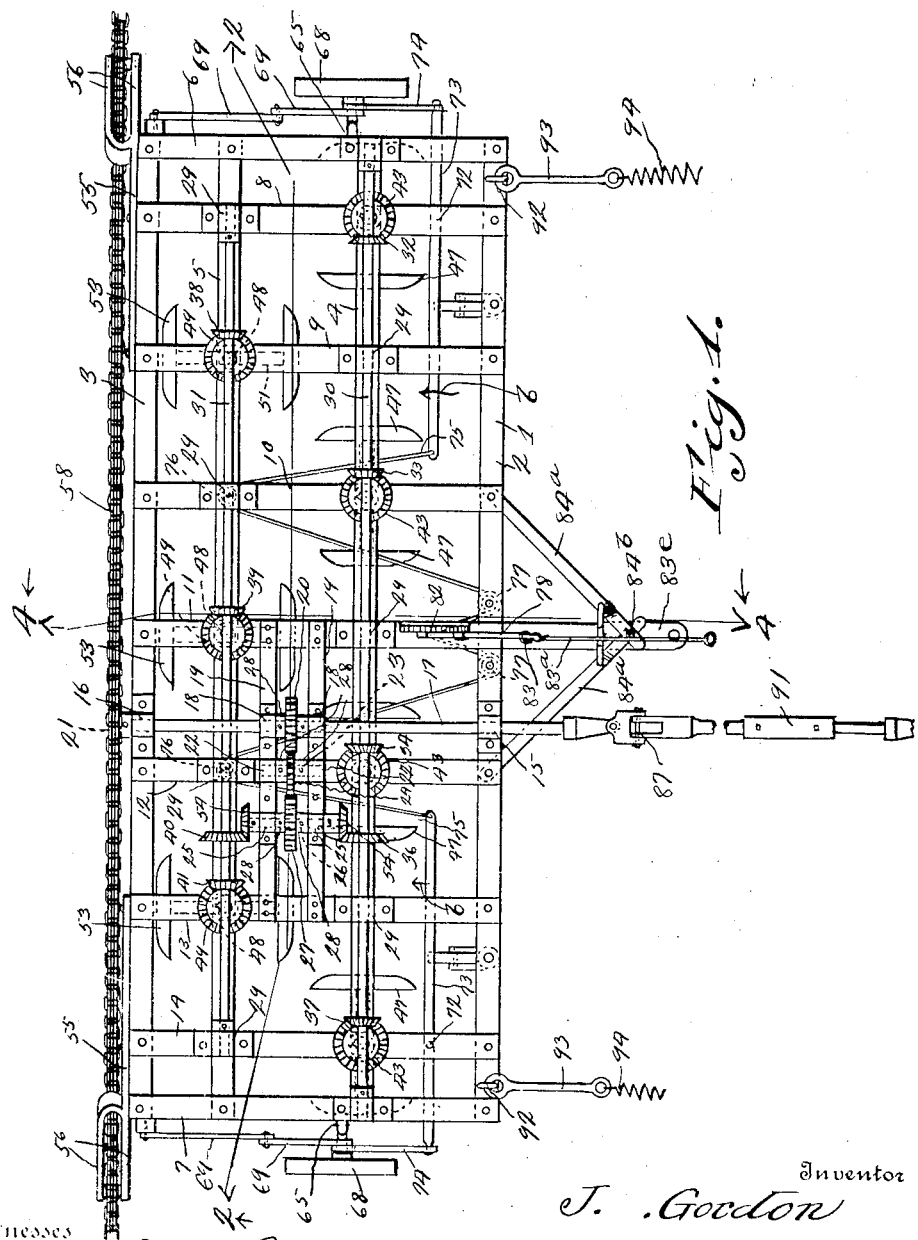
Figure 1 is a plan view of the improved harrow constructed in accordance with the invention.
Figure 2:
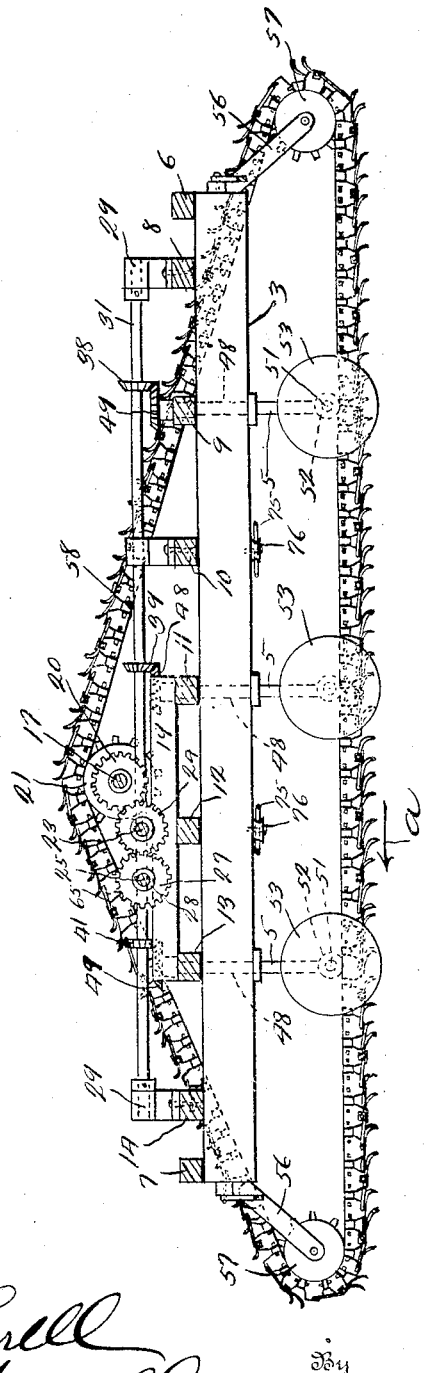
Fig. 2 is a sectional view on line 2—2 of Fig. 1.
Figure 3:
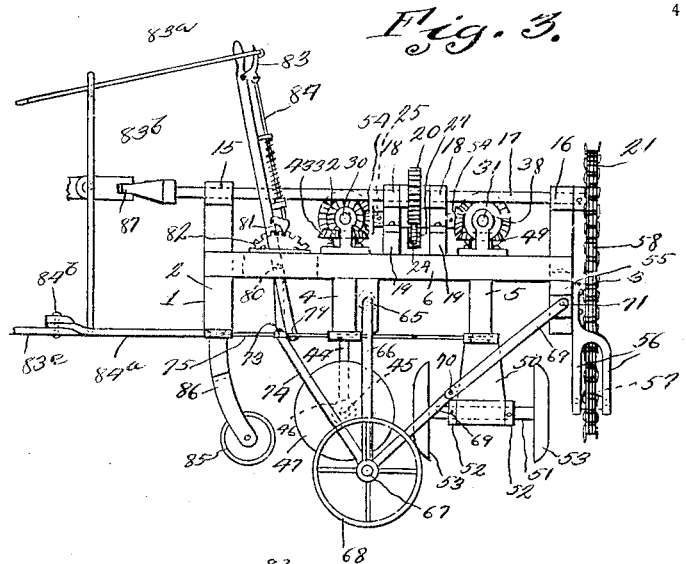
Fig. 3 is a side view of the harrow.
Figure 4:
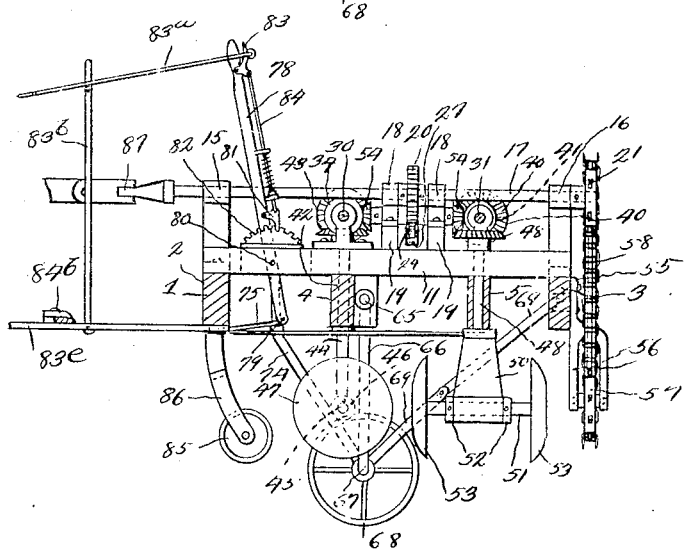
Fig. 4 is a transverse sectional view on line 4—4 of Fig. 1.

Referring more especially to the drawings, 1 designates the frame of the harrow, which may be any suitable construction, shape or configuration, preferably, such as that illustrated. This rectangular frame consists of the forward and rear elongated bars 2 and 3, and the intermediate elongated bars 4 and 5, and also the end bars 6 and 7, there being a series of intermediate transverse bars 8, 9, 10, 11, 12, 13 and 14. Mounted in bearings 15 and 16 is the main shaft 17 for driving the various harrows and mulching chain. This shaft 17 is also mounted in additional bearings 18, which are carried by the bars or beams 19, which connect the bars or beams 11, 12 and 13. Carried by and keyed to the shaft 17 is a gear 20 and a sprocket 21. Mounted in bearings 22 of the beams 19 is a shaft 23 having a gear 24 fixed thereon and in mesh with the gear 20. Also mounted in bearings 25 of said beams is a shaft 26, to which a gear 27 is fixed. There are suitable collars 28 pinned to the several shafts 17, 23 and 26 so as to hold the gears 20, 24 and 27 spaced in alinement. Mounted in suitable bearings 29 of the beams 8, 10, 11, 13 and 14, and also 12 are shafts 30 and 31. The shaft 30 is provided with bevel gears 32, 33, 34, 35, 36 and 37, while the shaft 31 is provided with bevel gears 38, 39, 40 and 41. Mounted in bearings of the beams or bars 8, 10, 12, and 14 are vertical shafts 42, the upper ends of which are provided with bevel gears 43, to mesh with the bevel gears 32, 33, 34 and 37. The lower ends of the shafts 42 terminate in enlargements 44, which contact with the under part of the beam or bar 4. Mounted in the lower ends of the enlargements 44 are transverse shafts 45, there being collars 46 pinned thereto to prevent axial movement of said shafts which are provided with harrow disks 47. It is to be noted that when the shaft 30 is rotated, the vertical shafts 42 through the medium of the gears 43 will be rotated, thereby revolving the shafts 45 on vertical axes, and in such case the harrow disks will not only whirl on the vertical axis but during such actions, they will roll and cut on the soil, and while the machine is moving forward the soil will be thoroughly agitated and harrowed. Mounted in bearings of the beam or bar 5, and also in bearings of the bars 9, 11 and 13 are vertical shafts 48, the upper ends of which have bevel gears 49, which mesh with the gears 38, 39 and 41, and their lower ends terminate in enlargements 50, the lower parts of which carry transversely arranged shafts 51, there being collars 52 to prevent axial movement of the shafts 51, which are provided with pivoted harrow disks 53. It is to be observed that the harrow disks as they contact with the soil or ground are capable of rolling or turning, since they revolve or whirl upon the vertical axes of the shafts 48, since the shaft 31 constitutes the medium for operating the vertical shafts 48. The shaft 26 on its ends is provided with bevel gears 54, which mesh with the bevel gears 36 and 40 respectively, so as to impart movement to the shafts 30 and 31, which in turn revolve the shafts 42 and 48. It is clearly obvious that the harrow disks 47 and 53 while the machine is moving forwardly will thoroughly agitate the soil and break up the clods. Secured to the rear beam or bar 3 of the frame are metallic plates 55 which are provided with spaced forks 56. These forks as shown clearly in Fig. 2 incline downwardly and laterally in opposite directions from the opposite ends of the frame, and mounted between the forks are sprockets 57. A suitable soil or clod mulching chain 58 is provided. This chain is in the form of a sprocket chain, which is of the usual construction and consists of the conventional arrangement of overlapping links 59, which are joined sequentially by the usual headed pins 60, which carry the usual rollers or sleeves 61. This sprocket chain is designed to engage the sprockets 21 and 57, the rollers 61 engaging between the teeth of said sprockets, whereby the chain easily travels over the sprocket. However, the outer overlapping links of the sprocket chain are provided with extension parts 62, in bearings of which the soil or clod mulching teeth or prongs are mounted. These prongs or teeth are practically interlinked. For instance each tooth member has a transverse part 63, which is mounted in the bearings of the extension parts 62, while the body of the tooth member is turned into a coil 64 which receives the transverse part 63 of an adjacent tooth member, there being a nut 65 threaded on the extremity of the transverse part 63 to prevent axial movement of the same and to retain the coil in place. The mulching tooth members as the chain revolves in the direction of the arrow $a$ in Fig. 2 extend downwardly toward and in engagement with the soil, so as to mulch the soil and break up the clods, and incidentally level off the soil, subsequently to harrowing the soil. Pivoted at 65 to the ends of the frame are depending arms or levers 66, the lower ends of which carry stub shafts 67 provided with supporting wheels 68. Normally these levers or arms are swung rearwardly, that is, when the harrow disks and mulching chain are in operation. Toggle links 69 (which are pivotally united as at 70) are provided. These toggle links 69 connect between the shafts 67 and the frame of the machine as at 71. Pivoted at 72 to the frame of the machine are levers 73, to the extremities of the short arms of which links 74 are pivotally connected. These links are in turn pivotally connected to the stub shafts 67. Suitable cables 75 are connected to the extremities of the long arms of the levers 73 and pass over the pulleys 76 and 77, and are connected to the lower end of the hand operating lever 78 as at 79. The lever 78 is pivoted at 80 and is provided with a dog 81, to engage the arcuate rack 82, there being a hand grip and spring pressed rod connection 83 and 84, for controlling the dog 81. By oscillating the lever 78 so that the levers 73 may move in the direction of the arrows $b$ in Fig. 1, the supporting wheels 68 may be lowered to raise the frame and the harrow disks and the mulching chain from contact with the soil, whereby the harrow may be moved from one place to another. However, when the harrow disks are in operation the frame is partly supported by the caster wheels 85 which are carried by the forked standards 86 of the frame of the machine, as shown clearly in Figs. 3 and 4, in order to steady the machine. The shaft 17 as shown clearly in Figs. 1 and 7 is provided with a flexible shaft connection 87 to an operating shaft of the tractor, whereby power may be transmitted to the shaft 17. In fact one end of the flexible end connection has a bevel gear 88, meshing with a bevel gear 89, which is designed to be carried by a power shaft 90 of the tractor (not shown). The harrow is drawn over the fields in the rear of the tractor, and as it is drawn, the harrow disks and the mulching chain are operated. The flexible shaft connection includes an adjustable slip telescopical joint 91, so as to regulate the distance between the harrow and the tractor. Eyes 92 are carried by the forward beam 1 of the frame, to which any suitable guy rods 93 (which includes springs 94) are connected. These guy rods may in turn be connected to the tractor so as to steady the harrow during its dragging action in the rear of the tractor.

The invention having been set forth what is claimed as new and useful is:—

1. In a rotary harrow and soil mulching apparatus, the combination with a frame, of a plurality of vertical shafts, harrow disks, mounted in pairs on said vertical shafts, whereby they may operate on vertical axes, a rotating mulching chain, and a driven power shaft mounted in bearings of the frame and having gear connections with the vertical shafts and the mulching chain for transmitting power thereto.

2. In a rotary harrow and soil mulching apparatus, the combination with a frame, of vertical shafts mounted in bearings of said frame, a plurality of harrow disks, said vertical shafts carrying at their lower ends loosely mounted transverse shafts, on which said harrow disks are journaled in pairs, whereby as the vertical shafts are rotated the harrow disks will revolve in pairs on vertical axes, a pair of elongated transverse shafts having gear connections with the vertical shafts, a transversely disposed rotating soil mulching device, and a driven power shaft in gear connection with said mulching device and the elongated transversely disposed shafts, whereby the device and the harrow disks may be operated.

3. In a rotary harrow and soil mulching apparatus, the combination with a frame, of vertical shafts mounted in bearings of said frame, a plurality of harrow disks, said vertical shafts carrying at their lower ends loosely mounted transverse shafts on which said harrow disks are journaled in pairs, whereby as the vertical shafts are rotated the harrow disks will revolve in pairs on vertical axes, a pair of elongated transverse shafts having gear connections with the vertical shafts, a transversely disposed rotating soil mulching device, and a driven power shaft in gear connection with said mulching device and the elongated transversely disposed shafts, whereby the device and the harrow disks may be operated, supporting wheels, loose connections between the wheels and the frame, and a mechanism for moving the supporting wheels to raise and lower the frame and the disks therewith.

In testimony whereof I have signed my name to this specification in the presence of two subscribing witnesses.

JAMES GORDON.

Witnesses:
  W. C. STULTS,
  ABE. BERGREN.